United States Patent [19]

Chhabra et al.

[11] Patent Number: 4,894,740
[45] Date of Patent: Jan. 16, 1990

[54] MAGNETIC HEAD AIR BEARING SLIDER

[75] Inventors: Devendra S. Chhabra; Dien Le Van; Henry S. Nishihira, all of San Jose, Calif.

[73] Assignee: International Business Machines Corporation, Armonk, N.Y.

[21] Appl. No.: 250,686

[22] Filed: Sep. 28, 1988

[51] Int. Cl.[4] .......................... G11B 5/60; G11B 21/21
[52] U.S. Cl. .................................................... 360/103
[58] Field of Search ......................... 360/103, 104, 106

[56] References Cited

U.S. PATENT DOCUMENTS

| 3,823,416 | 7/1984 | Warner | 360/122 |
|---|---|---|---|
| 4,555,739 | 11/1985 | Le Van et al. | 360/103 |
| 4,700,248 | 10/1987 | Coughlin et al. | 360/103 |
| 4,734,803 | 3/1988 | Nishihira | 360/103 |

FOREIGN PATENT DOCUMENTS

| 54-8514 | 1/1979 | Japan . |
|---|---|---|
| 61-170922 | 1/1986 | Japan . |

OTHER PUBLICATIONS

Anonymous Publication No. 25946, "Roll Insensitive Slider Design for Improved Disk File Reliability", Research Disclosure, Nov. 1985, No. 259.

Primary Examiner—Robert S. Tupper
Attorney, Agent, or Firm—Otto Schmid, Jr.

[57] ABSTRACT

An air bearing slider for supporting a magnetic transducer comprising a pair of coplanar side rails on the sides of an air bearing surface of the slider and a center rail along the central region of the air bearing surface to form recessed areas between the rails which extend from the leading to the trailing end of the slider. All the rails have a tapered section at their leading ends. The side rails have a width that does not exceed the width of the side rails at the leading end, and the side rails extend only part way to the trailing end of the slider. The width of the center rail is small at the leading end and greatest at the trailing end of the slider, where the transducer is supported.

14 Claims, 2 Drawing Sheets

MAGNETIC HEAD AIR BEARING SLIDER

FIELD OF THE INVENTION

This invention relates to a magnetic head slider assembly, and more particularly to a magnetic head slider which develops an air bearing to maintain a close spacing between the magnetic head and a recording surface.

DESCRIPTION OF THE PRIOR ART

Magnetic head assemblies that fly relative to magnetic media have been used extensively. These assemblies provide a non-contact transducing relationship between a magnetic transducer and a magnetic recording medium, such as a rotating magnetic disk, so that a stable constant spacing can be maintained between the transducer and the disk. In magnetic recording technology it is continually desired to improve the a real density at which information can be recorded and reliably road. This desire has led to a trend toward greater bit density along a magnetic recording track and a shrinking track width. The greater bit density requires increasingly narrow transducing gaps, so it becomes more difficult to achieve the low flying height constant to the degree required to reliably record and read data at the higher data rates.

Three rail sliders are known such as the three rail taper flat slider shown in commonly assigned U.S. Pat. No. 3,823,416 to Warner. In the Warner slider all three rails have uniform widths over their length and each of the rails has a taper section at the leading end of the slider. The magnetic transducer is formed by a core aligned with the center rail at the trailing end of the slider.

Commonly assigned U.S. Pat. No. 4,555,739 to LeVan et al describes a three rail slider in which all three rails are connected by a cross-rail at the leading end of the slider and the cross-rail has a leading taper section. A recessed area is provided back of the cross-rail which extends to the trailing end of the slider. Each of the three rails has a width which is less at the trailing end of the slider than at the cross-rail, and the transducer is formed at the trailing end of the middle rail.

The Japanese Kokai No. 54-8514 discloses a three rail slider in which all three rails have uniform width over their length. The two side rails are at an angle $\theta$ to the longitudinal center line of the slider, in which the angle $\theta$ is about 15 degrees. The transducer is mounted near the end of the center rail.

The Japanese Kokai No. 61-170922 discloses a three rail slider in which all three rails have uniform width over their length. Each of the rails has a taper at both the leading and the trailing ends of the slider. A small step is provided in the taper section of all three of the rails near the trailing end to reduce the dust deposited at the trailing end of the slider.

Two rail taper flat sliders have been used more recently, and a recent example is shown in commonly assigned U.S. Pat. No. 4,734,803 to Nishihira. This slider has two side rails which are wider at the leading end of the slider and extend to the trailing end of the slider where the magnetic transducer is mounted. A taper section is provided at the leading end of the slider, and the area between the side rails is open from the leading to the trailing ends of the slider.

The anonymous publication No. 25946 shown in RESEARCH DISCLOSURE, Nov. 1985, Number 259 discloses a magnetic head slider which has side rails connected by a front rail at the leading end to form a recessed section which produces a negative pressure. The side rails do not extend all the way to the trailing end of the slider and the magnetic transducer is mounted on an island at the center of the trailing end of the slider.

The prior art sliders were designed and optimized for disk files which used large disks and in which the transducers were also larger. For disk files using smaller disks it is desirable to reduce the slider size to permit more data capacity of each disk by increasing the data band. None of the prior art references address the problems encountered in the design of a smaller slider.

SUMMARY OF THE INVENTION

It is therefore the principal object of this invention to provide an air bearing slider which produces a pressure profile which causes the slider to fly at a chosen flying height and at a desired pitch angle with respect to a moving magnetic medium in a reduced size format.

In accordance with the present invention, an air bearing slider is provided for supporting a transducer and the slider comprises a pair of substantially coplanar side rails along the sides of an air bearing surface (ABS) and a center rail along the central region of the ABS of the slider to form recessed areas between the rails which extend from the leading to the trailing ends of the slider. All the rails have a tapered section at their leading end. The side rails have a width that does not substantially exceed the width of the side rails at their leading end, and the side rails extend only part way to the trailing end of the slider. The width of the center rail is small at the leading end and greatest at the trailing end of the slider, where the transducer is supported.

This air bearing slider structure produces a combined pressure profile which causes the slider to fly with the leading end at a desired pitch angle with respect to a moving magnetic medium, such as a magnetic disk, with the minimum spacing between the slider and the magnetic medium at the trailing end of the middle rail, where the magnetic transducer is mounted. This air bearing slider structure has sufficiently high pitch stiffness that it can be used in a small slider format.

In a specific embodiment, the slider has side rails having a first predetermined width at the leading end of the slider, and substantially parallel sides extending to a flared section. The flared section ends at a break point at which the side rails have a second predetermined width that is substantially less than the first predetermined width, and the side rails have substantially parallel sides extending from the breakpoint to the trailing end of the side rails.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 6 is a side elevation view of the sliders of FIGS. 2, 3 and 4.

DESCRIPTION OF THE PREFERRED EMBODIMENTS

Figure 1:
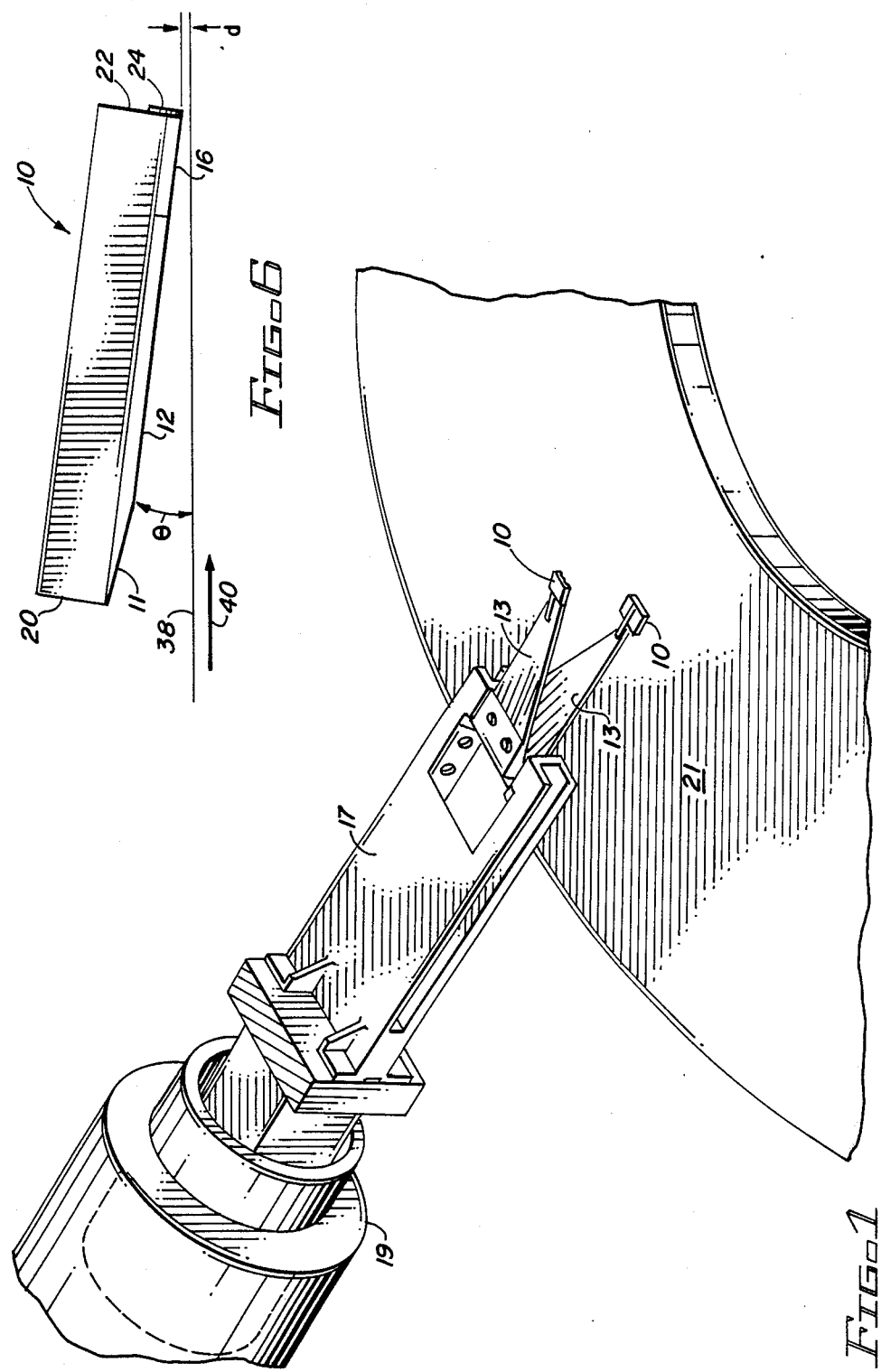
FIG. 1 is a schematic perspective view of a magnetic disk storage system.

With reference to FIG. 1, a magnetic disk storage system comprises a magnetic head arm 17, and at least one magnetic head suspension assembly is attached to head arm 17. In the embodiment shown, one magnetic head suspension assembly 13 is attached to the top of the head arm and another magnetic head suspension assembly 13 is attached to the bottom of the head arm 17. Each suspension assembly supports at its end a head slider 10, and each head slider head slider 10 has one or more magnetic transducer means, generally called magnetic heads, disposed so that the transducing gap may be in transducing relation with magnetic disk 21 surfaces, only one of which is shown in the drawing. Electrical signals are conducted from the magnetic heads to the host system for use in the host system. Head arm 17 is attached to a conventional actuator 19 such as a voice coil motor, for example, for accessing the magnetic heads to various tracks on the magnetic disk 21.

The slider 10 of the present invention is preferably a small slider since reduction of the slider size has many advantages such as cost, greater volumetric efficiency and performance. However, as the slider size is reduced, the flying height tolerances resulting from the manufacturing tolerances increase. The most significant contributions to the increase in flying height tolerances are from the pitch and roll parameters. For example, when the width of the slider is reduced by one half, the contribution from the roll sensitive parameters to the flying height approximately double, and when the length of the slider is reduced by one-half, the contribution from the pitch sensitive parameters to the flying height increases by approximately five times. It is the goal of the small slider design to reduce the size of the slider to approximately one half the presently used size in both the length and width directions. The present invention provides a design that produces superior performance in terms of maintaining a predetermined flying height tolerance in a small slider format.

With reference to the figures of the drawing, the air bearing surface (ABS) of a magnetic head slider 10, made in accordance with the invention, is formed with two side rails and 14 and a center rail 16. The inner sides of the side rails 12 and 14 and the sides of the center rail 16 border on recessed sections 18 that are formed by etching, ion milling, or other machining techniques, for example. The recessed sections 18 extend from the leading end 20 of the slider to the trailing end 22 of the slider. A magnetic transducer 24, preferably of the thin film type, is bonded at the trailing end of the center rail with its transducing gap flush with the rail surface. Both side rails 12 and 14 and center rail 16 all have tapered height sections 11 at their leading end.

The side rails 12 and 14 are widest at the leading end 20 of the slider, and the side rails 12 and 14 do not extend all the way to the trailing end of the slider. The ratio of 25 the length of the side rails to the length of the slider is less than 0.9 and preferably within the range of 0.5 to 0.8. In the embodiments shown in FIGS. 2 and 3 the side rails are narrower at their trailing end than at the leading end. In the embodiment shown in FIG. 4, the side rails are of a uniform width over their length. Other shapes of the side rails may also be suitable so long as they maintain a relatively high pressure at the leading end 20 of the slider and a relatively lower pressure in the middle area of the slider.

Figure 2:
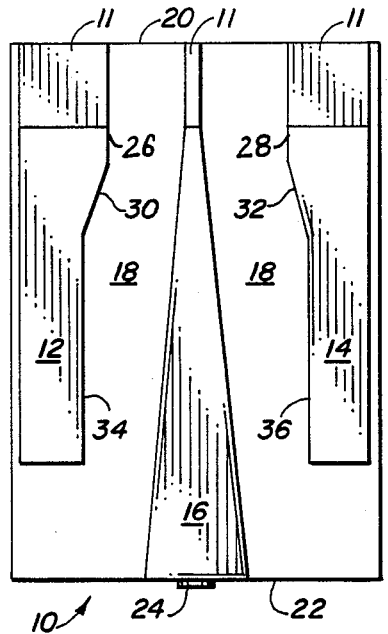
FIG. 2 is a bottom plan view of an air bearing slider embodying the present invention.

In the preferred embodiment of the invention shown in FIG. 2, each of the side rails includes a wide section 26 and 28 at the leading end 20 of the slider having substantially parallel sides and a flared section 30 and 32. Flared sections 30 and 32 extend to a break point from which they are followed by narrow sections 34 and 36 having substantially parallel sides and a width that is less than the width of wide sections 26 and 28. Narrow sections 34 and 36 extend to the end of the side rails.

Figure 3:
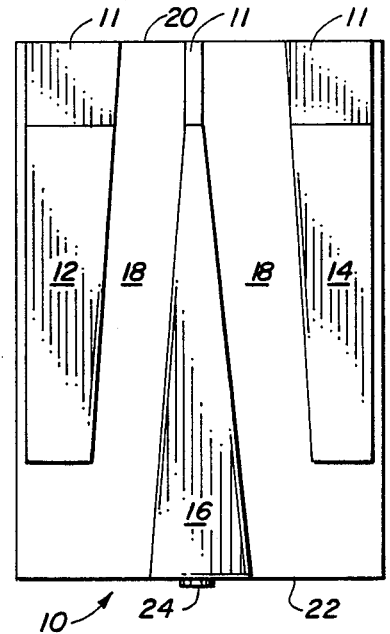
FIG. 3 is a bottom plan view of an alternate embodiment of an air bearing slider embodying the present invention.
Figure 4:
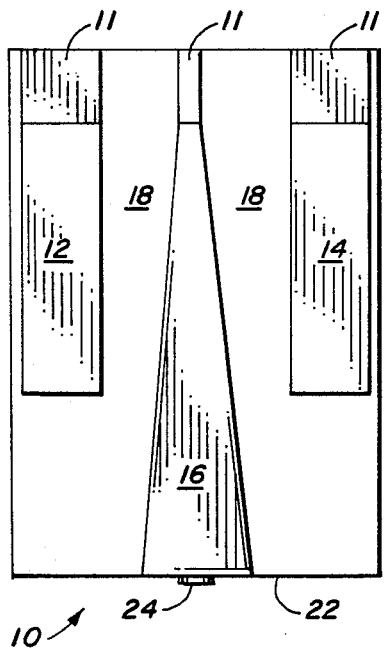
FIG. 4 is a bottom plan view of a further embodiment of an air bearing slider embodying the present invention.
Figure 5:
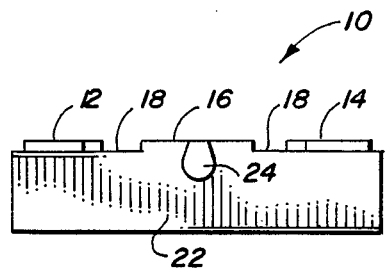
FIG. 5 is a view of the trailing end of the slider of FIG. 2.

The embodiment shown in FIG. 3 has side rails 12 and 14 that have a straight taper with the side rail being widest at the leading end 20 of the slider and narrowest at the trailing end of the side rails 12 and 14.

Center rail 16 comprises a taper section 11 at the leading end 20 of the slider and a width which is small at the leading end and increases progressively toward the trailing end 22 of the slider. Should any contaminants be present in the air bearing adjacent to the ABS 15 of slider 10, the shape of the center rail causes the contaminants to be directed along recesses 18 so that they are moved away from the transducer 24 at the trailing end of the center rail 16.

The configuration of the slider which is shown in the drawings and described above has different pressure zones. The pressure zones are formed when the ABS 15 of the slider is positioned adjacent to a magnetic recording surface 38 (FIG. 6) of magnetic disk 21 of moving in the direction of arrow 40 to provide load forces on the slider assembly that are balanced in such a manner that the desired flying characteristics for the slider can be achieved. The pressure components are combined so that the slider 10 flies at a desired pitch angle 8 relative to a moving magnetic disk 38 with an attitude by which the trailing end of slider 10, where the transducer is mounted, is closest to the disk surface and assured to be spaced at a flying height distance d from the magnetic recording medium surface 38.

The design approach to reduce the contribution to flying height tolerance from the pitch and roll sensitive parameters is accomplished, in the described embodiments, by having a larger load carried by the center rail at the trailing end, which is also the minimum spacing location with respect to the disk because of the shorter side rails, in balanced equilibrium with the large load carried by the side rails near the leading end of the slider. The pressure from the side rails is high at the leading end of the slider due to the taper sections 11 and the greater width at the leading end of the slider. The pressure from the side rails is progressively decreased and ends prior to the reaching the trailing end of the slider. The center rail 16 generates very little pressure at the leading end 20 of the slider, but the pressure from the center rail 16 progressively increases and is highest near the trailing end 22 of the slider.

The resulting combined pressure profile has high pressure near the leading end 20 of the slider 10, a relatively low pressure in the middle of the slider, and a relatively high pressure near the trailing end 22 of the slider. This design approach ensures that the minimum spacing between the slider and the disk, on which recording performance and head/disk interface reliability depend, is very insensitive to roll parameters, thus slider width can be significantly reduced. Furthermore, the high air bearing pressure at the center rail trailing end and the side rail leading ends ensures sufficiently high air bearing pitch and vertical stiffness, so that the length can also be significantly reduced. This design approach has made possible the design of sliders with lengths significantly smaller than was otherwise possible.

While the invention has been particularly shown and described with reference to a preferred embodiment thereof, it will be understood by those skilled in the art that various other changes in the form and details may be made therein without department from the spirit and scope of the invention.

We claim:

1. A magnetic disk recording system comprising:
   a magnetic recording medium having a recording surface;
   a magnetic transducer and an air bearing slider supporting said transducer;
   head arm means for supporting said air bearing slider with said magnetic transducer closely adjacent to the recording surface of said magnetic recording medium;
   accessing means for supporting said head arm means and for moving said head arm means relative to the recording surface of said magnetic recording medium;
   said air bearing slider having leading and trailing ends and an air bearing surface;
   side rails disposed along the sides of said air bearing surface of said air bearing slider, said side rails being substantially coplanar and extending from the leading end of said slider part way to the trailing end of said slider, said side rails having a tapered section formed on the air bearing surface at said leading end, each said side rail having a width measured normal to the leading to trailing dimension of said slider which does not substantially exceed the width of said side rails at said leading end of said slider; and
   a center rail disposed along the central region of said air bearing surface, said center rail being separated from said side rails by recessed. Areas which extend from said leading end to said trailing end of said slider, said center rail having a taper section at said leading end, said center rail having a width measured normal to the leading to trailing dimension of said slider which is small at said leading end and which is greatest at said trailing end of said slider whereby said slider is positioned adjacent said magnetic recording medium in an orientation having a predetermined pitch angle and a predetermined spacing with respect to said moving magnetic recording medium in which the minimum spacing between said slider and said magnetic medium occurs at the trailing end of said slider.

2. An air bearing slider for supporting a transducer comprising;
   a slider structure having leading and tailing ends and an air bearing surface;
   side rails disposed along the sides of said air bearing surface of said slider structure, said side rails being substantially coplanar and extending from the leading end of said slider structure part way to the trailing end of said slider structure, said side rails having a tapered section formed on the air bearing surface at said leading end, each said side rail having a width measured normal to the leading to trailing dimension of said slider which does not substantially exceed the width of said side rails at said leading end of said slider; and
   a center rail disposed along the central region of said air bearing surface, said center rail being separated from said side rails by recessed areas which extend from said leading end to said trailing end of said slider, said center rail having a taper section at said leading end, said center rail having a width measured normal to the leading to trailing dimension of said slider which is small at said leading end and which is greatest at said trailing end of said slider.

3. The air bearing slider as in claim 2, wherein said rails and said recessed sections produce a combined pressure profile, when said slider is positioned adjacent a moving magnetic recording medium, so that said slider assumes an 5 orientation having a predetermined pitch angle and a predetermined spacing with respect to said moving magnetic medium in which the minimum spacing between said slider and said magnetic medium occurs at the trailing end of said slider.

4. The air bearing slider as in claim 3, wherein the ratio of the length of said side rails to the length of said slider is less than 0.9.

5. The air bearing slider as in claim 3, wherein the ratio of the length of said side rails to the length of said slider is within the range of 0.5 to 0.8.

6. An air bearing slider for supporting a transducer comprising;
   a slider structure having leading and trailing ends and an air bearing surface;
   side rails disposed along the sides of said air bearing surface of said slider structure, said side rails being substantially coplanar and extending from the leading end of said slider structure part way to the trailing end of said slider structure, said side rails having a tapered section formed on the air bearing surface at said leading end, each said side rail comprising a first part having a first predetermined width, as measured normal to the leading to trailing dimension of said slider, at said leading end of said side rail structure and width that decreases to a second part having a second predetermined width at a break point, said break point being located between said leading end and said trailing end of said side rails, wherein said width of said side rails does not substantially exceed said second predetermined with between said break point and said trailing end of said side rails; and
   a center rail disposed along the central region of said air bearing surface, said center rail being separated from said side rails by recessed areas which extend from said leading end to said trailing end of said slider, said center rail having a taper section at said leading end, said center rail having a width measured normal to the leading to trailing dimension of said slider which is small at said leading end and which is greatest said trailing end of said slider.

7. The air bearing slider as in claim 6, wherein said rails and said recessed sections produce a combined pressure profile, when said slider is positioned adjacent a moving magnetic medium, so that said slider assumes an orientation having a predetermined pitch angle and a predetermined spacing with respect to said moving magnetic recording medium in which the minimum spacing between said slider and said magnetic medium occurs at the trailing end of said slider.

8. The air bearing slider as in claim 7, wherein the width of said side rails does not substantially exceed the width of said side rails at said leading end of said slider.

9. The air bearing slider as in claim 8, wherein the ratio of the length of said side rails to the length of said slider is less than 0.9.

10. The air bearing slider as in claim 9, wherein the ratio of the length of said side rails to the length of said slider is within the range of 0.5 to 0.8.

11. The air bearing slider as in claim 4, wherein the parts of said side rails having said first and said second predetermined widths are connected by a flared section.

12. The air bearing slider as in claim 11, wherein said parts of said side rails having said first and said second predetermined widths have sides that are substantially parallel.

13. The air bearing slider as in claim 12, wherein the ratio of the length of said side rails to the length of said slider is less than 0.9.

14. The air bearing slider as in claim 12, wherein the ratio of the length of said side rails to the length of said slider is within the range of 0.5 to 0.8.

* * * * *

UNITED STATES PATENT AND TRADEMARK OFFICE
CERTIFICATE OF CORRECTION

PATENT NO. : 4,894,740

DATED : January 16, 1990

INVENTOR(S) : D. S. Chhabra et al

It is certified that error appears in the above-identified patent and that said Letters Patent is hereby corrected as shown below:

Column 3, Line 52, after "rails", insert --12--

Column 4, Line 35, after "21", delete --of--

Column 4, Line 40, delete "8", insert --$\theta$--

Column 5, Line 45, delete "recessed. Areas", insert --recessed areas--

Column 6, Line 19, delete "5"

Column 6, Line 51, delete " with", insert --width--

Signed and Sealed this

Fifth Day of November, 1991

Attest:

HARRY F. MANBECK, JR.

Attesting Officer

Commissioner of Patents and Trademarks